United States Patent

Ritz et al.

[11] Patent Number: 5,838,673
[45] Date of Patent: Nov. 17, 1998

[54] RADIO TELEPHONE SYSTEM FOR MINIMIZING CO-CHANNEL INTERFERENCE UTILIZING GEOGRAPHIC SEPARATION OF SIGNALS AND TRANSMISSION POWER CONTROL

[75] Inventors: Mordechai Ritz, Givat Elah; Giora Silbershatz, Haifa; Shmuel Miller, Tal-El, all of Israel

[73] Assignee: Geotek Industries, Inc., Montvale, N.J.

[21] Appl. No.: 557,030

[22] PCT Filed: Dec. 16, 1994

[86] PCT No.: PCT/US94/14562

§ 371 Date: Jul. 2, 1996

§ 102(e) Date: Jul. 2, 1996

[87] PCT Pub. No.: WO95/17048

PCT Pub. Date: Jun. 22, 1995

[30] Foreign Application Priority Data

Dec. 16, 1993 [IL] Israel ........................................ 108056

[51] Int. Cl.[6] .................................................. H04B 1/713
[52] U.S. Cl. ........................... 370/336; 370/341; 370/345; 370/442; 375/202; 379/59; 455/34.1; 455/38.3; 455/54.1
[58] Field of Search .................................... 370/313, 314, 370/328, 329, 335, 336, 337, 338, 341, 345, 347, 442; 375/202, 203, 295; 379/58, 59; 455/33.1, 33.4, 34.1, 38.1, 38.3, 53.1, 54.1

[56] References Cited

U.S. PATENT DOCUMENTS

| 4,866,710 | 9/1989 | Schaeffer | 370/330 |
|---|---|---|---|
| 5,287,384 | 2/1994 | Avery et al. | 375/202 |
| 5,291,475 | 3/1994 | Bruckert | 370/330 |
| 5,301,188 | 4/1994 | Kotzin et al. | 370/330 |
| 5,311,504 | 5/1994 | Colamonico et al. | 370/330 |
| 5,381,443 | 1/1995 | Borth et al. | 370/329 |
| 5,386,435 | 1/1995 | Cooper et al. | 370/277 |

FOREIGN PATENT DOCUMENTS

WO 95/17048  6/1995  WIPO.

Primary Examiner—Benedict V. Safourek
Assistant Examiner—Ricky Ngo
Attorney, Agent, or Firm—Cobrin Gittes & Samuel

[57] ABSTRACT

A system for minimizing co-channel interference between transmission sectors at their common periphery. The system exploits the geographic separation of potentially interfering mobile transmitters and utilizes transmission power control. The system employs sectored antennas in a combined frequency hopping, TDMA system wherein each subscriber in a particular sector is assigned a time slot in the system based upon that subscriber's geographic location within that sector. The transmission power in the sector is reduced during certain predetermined time slots and subscribers who are remote from the fringe of the sector are assigned to these power reduced time slots. During up-link the transmission power for subscribers located proximal to the fringe are reduced to cause less co-channel interference between their signals and the signals from other subscribers in different sectors having the same time slot.

8 Claims, 3 Drawing Sheets

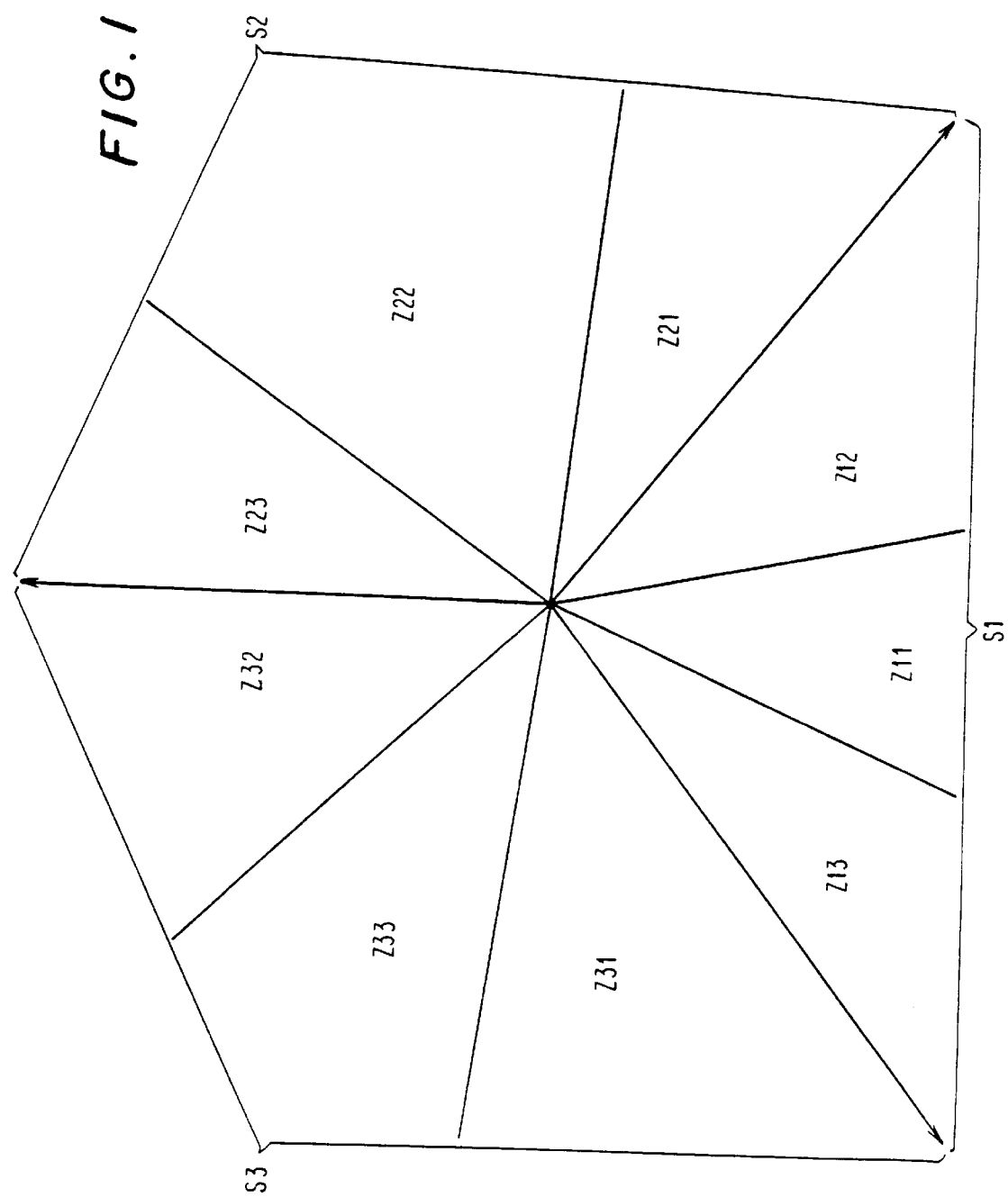

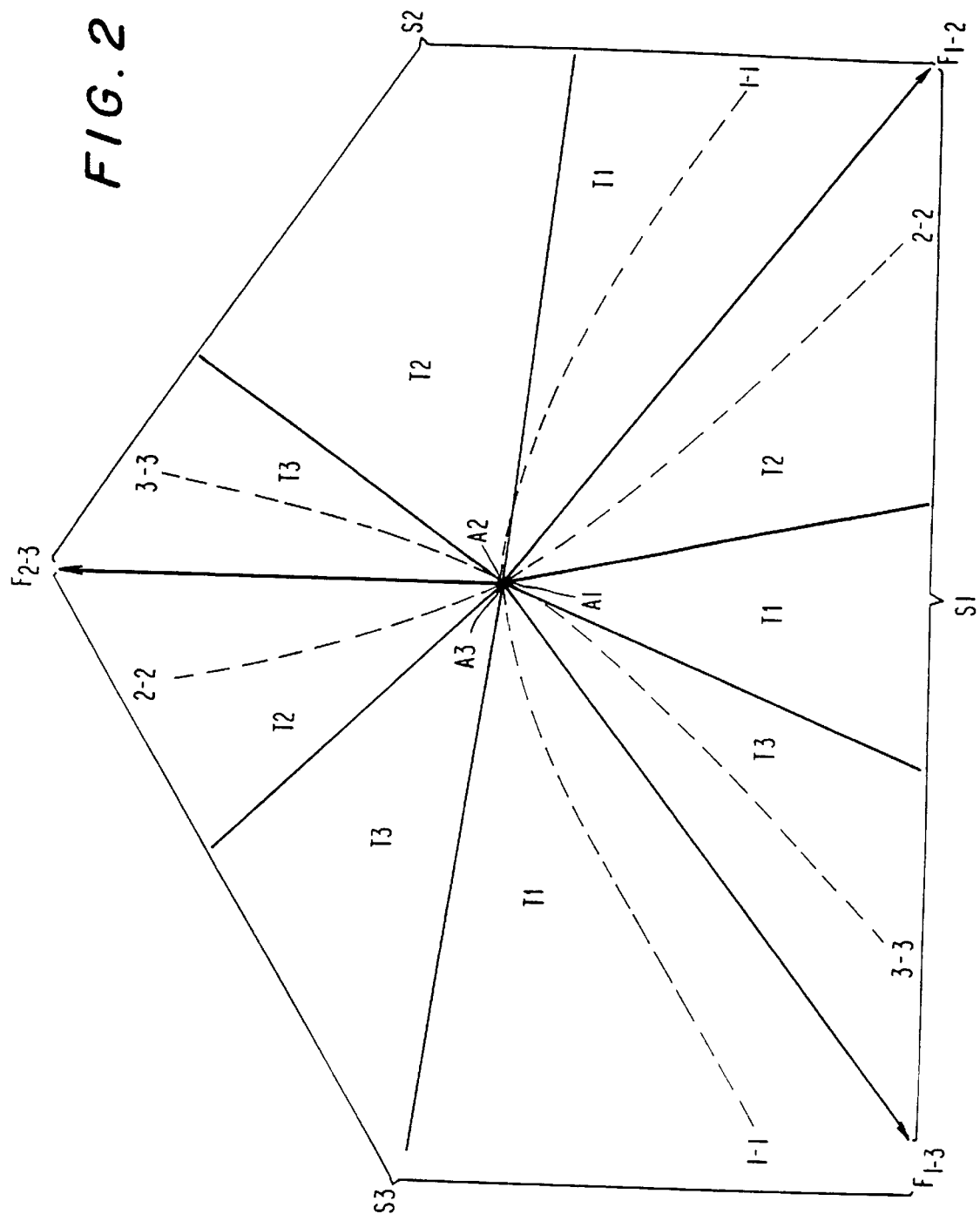

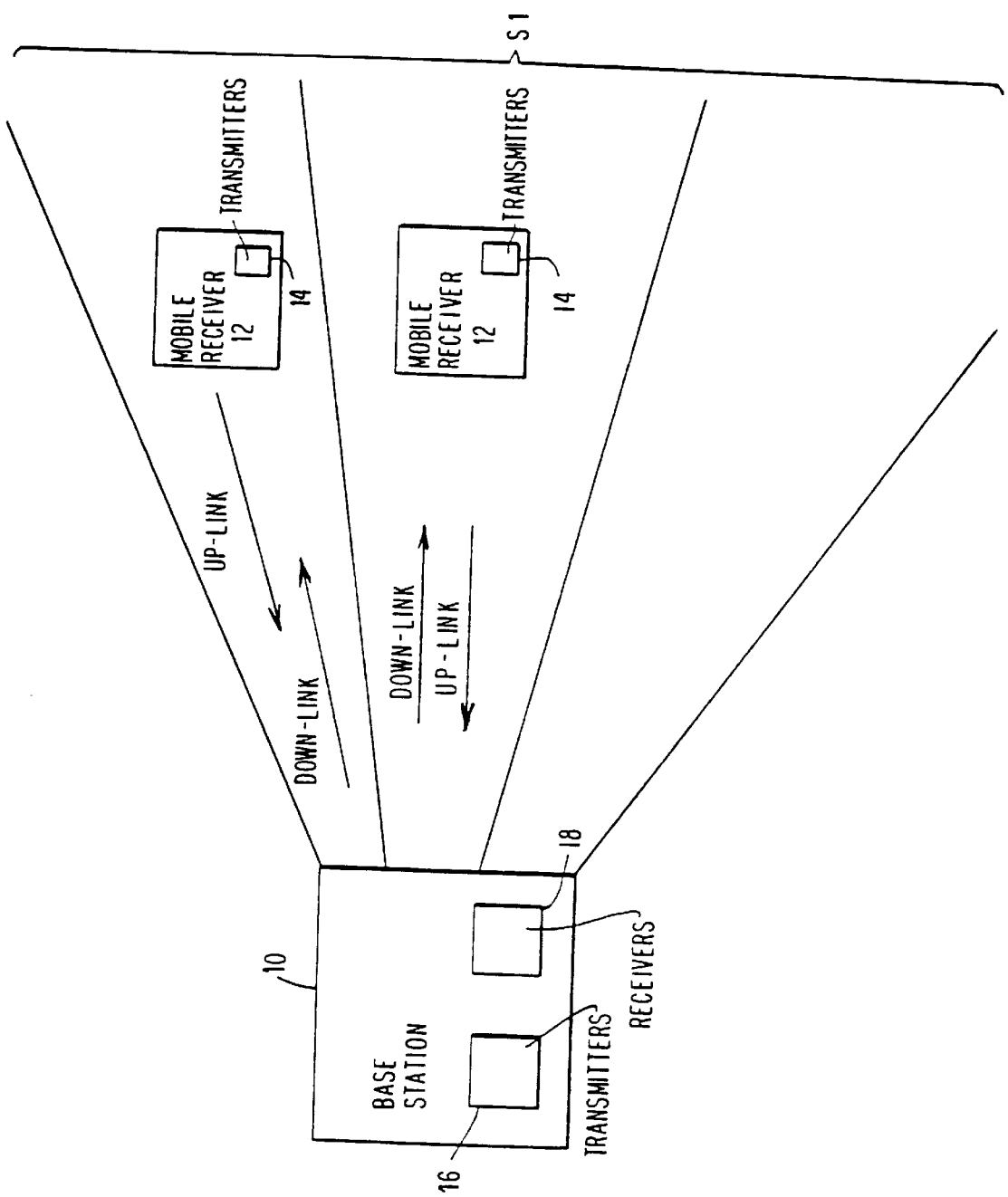

RADIO TELEPHONE SYSTEM FOR MINIMIZING CO-CHANNEL INTERFERENCE UTILIZING GEOGRAPHIC SEPARATION OF SIGNALS AND TRANSMISSION POWER CONTROL

FIELD OF THE INVENTION

This invention relates generally to a system for minimizing co-channel interference and more particularly, to a system for minimizing co-channel interference utilizing geographic separation of signals and transmission power control.

BACKGROUND OF THE INVENTION

In general, the purpose of a radio telephone communication system is to transmit information-bearing signals from a source, located at one point to a user destination, located at a point some distance away. A radio telephone communication system generally includes three basic components: transmitter, radio communication channel, and receiver.

In a Frequency Hopping multiple access communications system such as disclosed in co-pending U.S. Pat. application Ser. No. 08/080,075 filed Jun. 1, 1993 and Israeli Patent Application Serial No. 103,620 filed Nov. 3, 1992, a set of N carrier frequencies are reused in adjacent communications sites to provide greater than N minimally cross correlated frequency hopping radio communication channels.

In Time Division Multiplexing ("TDM"), a wideband channel is subdivided into several narrowband channels by allocating the use of the wideband channel to the different narrowband channels during different time slots. Each of these narrowband channels is assigned to different users to allow for contemporaneous utilization of the wideband channel resources by many users.

Time Division Multiple Access ("TDMA") is a technique by which a large population of subscribers with a low individual probability of becoming active get access to the channel resources. This technique relies on a dynamic TDM slot allocation. Similarly, Frequency Division Multiple Access ("FDMA") is an access mechanism for which the underlying multiplexing technique is Frequency Division Multiplexing ("FDM").

It has been proposed that each of the above minimally cross correlated frequency hopping radio communication channels be further divided by time division multiplexing. When high usage of this system occurs substantial co-channel interference is experienced.

PCT patent application, International Publication No. WO 93/10601, published May 27, 1993, discloses a multiple access communications system in which a measure of co-channel interference in a first radio communication channel being used in a first geographic area is determined. The system reacts to the measure exceeding a predetermined level to switch the user to a second radio communication channel in the same geographic area. This system does not address the problem of co-channel interference by minimizing such interference but reacts to the problem after the interference is detected.

It is accordingly an object of the invention to minimize co-channel interference in a multiple access communications system.

It is another object of the invention to minimize co-channel interference in a time division multiple access communications system.

It is still another object of the invention to provide a method of minimizing co-channel interference in such a system by utilizing geographic separation of signals.

It is a further object of the invention to provide a method of minimizing co-channel interference in such a system by utilizing geographic separation of signals and transmission power control.

It is a still further object of the invention to minimize co-channel interference in a time division multiple access communications system which is also frequency hopped.

SUMMARY OF THE INVENTION

The foregoing objects are attained by the invention, which provides a method of and apparatus for minimizing co-channel interference by geographic separation of signals and transmission power control in a combined Frequency Hopping/TDMA radio telephone system. The invention includes a first sector divided into geographic zones, and an adjoining second sector divided into the same number of geographic zones. Time slots are selectively allocated to each of the different geographic zones in the first sector and the same time slots are allocated to the geographic zones in the second sector but in a different order. Thus, every user located within a particular geographic zone within a sector is assigned the same time slot. In addition, each time zone has an up-link and down-link transmission power associated with it.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and accompanying drawings, in which:

FIG. 1 depicts a diagram of three adjoining sectors in a combined Frequency Hopping/TDMA radio telephone system, in which a system for minimizing co-channel interference operates in accordance with the invention; showing each sector divided into different geographic zones;

FIG. 2 depicts the sectors of FIG. 1, showing time slot allocations and transmission overlap between the different sectors;

FIG. 3 depicts a base station and mobile receivers; showing a transmitter, a receiver in a base station, a transmitter in the mobile receivers and showing the up-link and down-link transmissions.

DETAILED DESCRIPTION OF THE INVENTION

FIG. 1 is a diagram of three sectors in a combined Frequency Hopping/TDMA radio telephone system in which an embodiment of the invention operates, showing three sectors S1, S2 and S3 each adjoining the other two, wherein each sector is divided into three geographic zones Z11, Z12 Z13, Z21, Z22 Z23, Z31, Z32 and Z33.

FIG. 2 is a diagram of the three sectors of FIG. 1 showing the different geographic zones Z11, Z12 Z13, Z21, Z22 Z23, Z31, Z32 and Z33 having corresponding TDM time frame time slot allocations T1, T2 and T3, transmission fields 1—1, 2—2 and 3—3 of the different antennas A1, A2 and A3 and the areas of transmission overlap $F_{1-2}$, $F_{1-3}$ and $F_{2-3}$ between transmission fields 1—1, 2—2 and 3—3. As will be obvious to one skilled in the art, it is possible to have more than three time-slots and thus more than three geographic zones in each sector, but for ease of explanation the three zone per sector system will be described.

FIG. 3 is a diagram of the relationship between base station 10 and a mobile receiver 12 during down-link transmission and during up-link transmission. During down-link transmission, transmitter 16 can generate a signal to transmit to a particular sector. During up-link transmission, transmitter 14 can generate a signal to transmit from mobile receiver 12. Base station 10 is also capable of assigning time slots to users located in the various geographic zones.

FIG. 2 illustrates what may occur with a three time slot repeat pattern in each sector, and roughly the same frequency capacity in each sector. Sector S1 is split into three geographic zones Z11, Z12 and Z13, each zone Z11, Z12 and Z13 being determined by a corresponding time slot T1, T2 and T3. Sectors S2 and S3 are each divided into an equal number of geographic zones as sector S1 (in this configuration three), Z21, Z22, Z23, Z31, Z32 and Z33 such that each zone Z21, Z22, Z23, Z31, Z32 and Z33 is determined based upon a corresponding time slot T1, T2 and T3 associated with it. In the three time slot example, the sequences of the time slots T1, T2 and T3 in sectors S2 and S3 are dictated from the order of the time slots T1, T2 and T3 in sector S1.

The geographic zones Z21 and Z31 located along the fringes $F_{1-2}$, and $F_{1-3}$ respectively, of sectors S2 and S3 should be allocated the same time slot as the central time zone in sector S1 (in this case T1). The central geographic zones Z22, and Z33 in sectors S2 and S3 respectively, should be allocated the same time slots as the geographic zones in sector S1 located adjacent to the respective sectors S2 and S3 (i.e. geographic zone Z22 should be allocated time slot T2 as is zone Z12 and zone Z33 should be allocated time slot T3 as is zone Z13).

Transmissions during each time slot T1, T2 and T3 have transmission power stipulations associated with them for transmission during up-link and down-link. In this illustration a transmission in time slot T1 in sector S1 has a down-link transmission power associated with it that is lower than the transmission power associated with time slots T1 in sectors S2 and S3, but the transmission power during up-link is normal. Transmissions in time slots T2 and T3 in sector S1 both have normal down-link transmission power associated with them, but they both have up-link transmission power associated with them that is lower than the up-link power associated with the corresponding time slots in the adjoining sectors. In sector S2, transmissions in time slot T2 have the lower down-link transmission power associated with them and normal up-link power, while transmissions in time slot T1 and T3 have normal down-link power associated with them, but lower up-link power. In sector S3, transmissions in time slot T3 have the lower down-link transmission power associated with them and normal up-link power, while transmissions in time slots T1 and T2 have normal down-link power associated with them, but lower up-link power. In this embodiment, time slots T1, T2 and T3 in sectors S1, S2 and S3 respectively are allocated to mobile transmitters located in the central geographic zones Z11, Z22 and Z33 respectively.

In the three time slots per sector embodiment, use of the radio channels during time slots that have transmissions which have lower down-link transmission power associated with them is allocated to users in the central geographic zones (i.e. in S1 the set of users in Z11 would get T1, in S2 the set of users in Z22 would get T2 and in S3 the set of users in Z33 would get T3), while time slots that have transmissions which have lower up-link transmission power associated with them are allocated to users located near the fringe of the sector (i.e. in S1 the set of users in Z12 or Z13 would get T2 or T3 respectively, in S2 the set of users in Z21 or Z23 would get T1 or T3 respectively and in S3 the set of users in Z31 or Z32 would get T1 or T2 respectively). This arrangement minimizes the possibility of co-channel interference by geographically separating the users and by controlling the transmission power.

By lowering the transmission power to users in the central zone during down-link, the areas of transmission overlap $F_{1-2}$, $F_{1-3}$ and $F_{2-3}$ decrease, and the power of the interfering signal (i.e. the signal from S2 during time T2 in sectors S1 and S3) is very weak as compared to the signal coming from the proper sector antenna (i.e. the signal from antenna A1 during time T2 will be much stronger in sector S1 during time T2 than the signal in sector S1 from antenna A2). Thus, because of this disparity in the strength of the two signals, the overlapping signal will not interfere with the actual signal.

By lowering the transmission power from users in the zones located in the fringes of the sectors during up-link, there is less of a chance for co-channel interference, again because there will be less of a transmission overlap and more of a disparity in the strength of the signals.

The transmission power from any region is determined by the requirements for the received signal strength. Subscriber units which are located in regions in which the transmission power needs enhancement, can transmit at higher power levels than that required for transmissions from subscriber units which are located in locations in which the transmissions get no co-channel interference. Communications are not being degraded for some subscriber units to increase quality for other subscriber units, rather communications are being improved for subscriber units located in problem areas.

It will thus be seen that the invention efficiently attains the objects set forth above, among those made apparent from the preceding description. In particular, the invention provides a system for minimizing co-channel interference in a combined Frequency Hopping/TDMA system. Those skilled in the art will appreciate that the configuration depicted in FIG. 1 minimizes the possibility of co-channel interference efficiently and effectively.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A radio telephone system employing a central base station and a plurality of mobile receivers for operating in an area divided into a plurality of transmission sectors extending radially outward from said base station, said base station assigning a plurality of frequency hopping radio channels to each of said plurality of transmission sectors, said frequency hopping radio channels having at least first, second and third time division time slots, said system comprising:

a first geographic zone located in the central portion of a first of said transmission sectors, said base station being capable of assigning a first of said time division time slots of each of said radio channels assigned to said first of said transmission sectors to a first set of users located in said first geographic zone;

a second geographic zone located in a fringe portion of said first of said transmission sectors, said base station being capable of assigning a second of said time division time slots of each of said radio channels assigned to said first of said transmission sectors to a second set of users located in said second geographic zone;

a third geographic zone located in a fringe portion of a second of said transmission sectors, said base station being capable of assigning said first of said time division time slots of each of said radio channels assigned to said second of said transmission sectors to a third set of users located in said third geographic zone;

a transmitter in said base station for generating transmissions from said base station in said first of said transmission sectors covering said first of said transmission sectors and overlapping into said third geographic zone of said second of said transmission sectors, said first sector transmissions from said base station in said first time division time slot having a first down-link transmission power;

a transmitter in said base station for generating transmissions from said base station in said second of said transmission sectors covering said second of said transmission sectors and overlapping into said second geographic zone of said first of said transmission sectors, said second sector transmissions from said base station in said first time division time slot having a second down-link transmission power, said first down-link transmission power being less than said second down-link transmission power.

2. A radio telephone system of claim 1 further comprising a transmitter in said mobile receivers for generating up-link transmissions from said mobile receivers in said first geographic zone in said first of said transmission sectors, said first sector up-link transmissions in said first time division time slot having a first up-link transmission power; and a transmitter in said mobile receivers for generating up-link transmissions from said mobile receivers in said third geographic zone in said second of said transmission sectors, said second sector up-link transmissions in said first time division time slot having a second up-link transmission power, said second up-link transmission power being less than said first up-link transmission power.

3. A radio telephone system of claim 1 further comprising a fourth geographic zone located in a center portion of said second of said transmission sectors, said base station being capable of assigning said second of said time division time slots of each of said radio channels assigned to said second of said transmission sectors to a fourth set of users located in said fourth geographic zone;

a transmitter in said mobile receivers for generating up-link transmissions from said mobile receivers in said second geographic zone in said first of said transmission sectors, said first sector up-link transmissions in said second time division time slot having a third up-link transmission power; and a transmitter in said mobile receivers for generating up-link transmissions from said mobile receivers in said fourth geographic zone in said second of said transmission sectors, said second sector up-link transmissions in said second time division time slot having a fourth up-link transmission power, said third up-link transmission power being less than said fourth up-link transmission power.

4. A radio telephone system of claim 3 further comprising said first sector transmissions from said base station in said second time division time slot having a third down-link transmission power; and said second sector transmissions from said base station in said second time division time slot having a fourth down-link transmission power, said fourth down-link transmission power being less than said third down-link transmission power.

5. A method of allocating radio channels in a radio telephone system employing a central base station and a plurality of mobile receivers for operating in an area divided into a plurality of transmission sectors extending radially outward from said base station, said base station assigning a plurality of frequency hopping radio channels to each of said plurality of transmission sectors, dividing said frequency hopping radio channels into at least first, second and third time division time slots, said system comprising:

defining a first geographic zone located in the central portion of a first of said transmission sectors, assigning said first of said time division time slots of each of said radio channels to a first set of users located in said first geographic zone;

defining a second geographic zone located in a fringe portion of said first of said transmission sectors, assigning a second of said time division time slots of each of said radio channels to a second set of users located in said second geographic zone;

defining a third geographic zone located in a fringe portion of a second of said transmission sectors, assigning said first of said time division time slots of each of said radio channels to a third set of users located in said third geographic zone;

transmitting a first sector signal from a transmitter in said base station to said first of said transmission sectors, said first sector signal covering said first of said transmission sectors and overlapping into said third geographic zone of said second of said transmission sectors;

allocating a first down-link transmission power to said first sector signal in said first time division time slot;

transmitting a second sector signal from a transmitter in said base station to said second of said transmission sectors, said second sector signal covering said second of said transmission sectors and overlapping into said second geographic zone of said first of said transmission sectors;

allocating a second down-link transmission power to said second sector signal in said first time division time slot, said first down-link transmission power being less than said second down-link transmission power.

6. A method of allocating radio channels in a radio telephone system of claim 5 further comprising transmitting a first sector up-link signal from a transmitter in said mobile receivers located in said first geographic zone;

allocating a first up-link transmission power to said first sector up-link signal in said first time division time slot;

transmitting a second sector up-link signal from a transmitter in said mobile receivers located in said third geographic zone; and allocating a second up-link transmission power to said second sector up-link signal in said first time division time slot, said second up-link transmission power being less than said first up-link transmission power.

7. A method of allocating radio channels in a radio telephone system of claim 5 further comprising defining a fourth geographic zone located in a center portion of said second of said transmission sectors, assigning said second of said time division time slots of each of said radio channels to a fourth set of users located in said fourth geographic zone;

transmitting a first sector up-link signal from a transmitter in said mobile receivers located in said second geographic zone;

allocating a third up-link transmission power to said first sector up-link signal in said second time division time slot;

transmitting a second sector up-link signal from a transmitter in said mobile receivers located in said fourth geographic zone; and allocating a fourth up-link transmission power to said second sector up-link signal in said second time division time slot, said third up-link transmission power being less than said fourth up-link transmission power.

8. A radio telephone system of claim 5 further comprising allocating a third down-link transmission power to said first sector signal in said second time division time slot; and allocating a fourth down-link transmission power to said second sector signal in said second time division time slot, said fourth down-link transmission power being less than said third down-link transmission power.

* * * * *